United States Patent [19]
Cooper et al.

[11] 3,906,166
[45] Sept. 16, 1975

[54] RADIO TELEPHONE SYSTEM

[75] Inventors: Martin Cooper, Glencoe; Richard W. Dronsuth, Westchester; Albert J. Mikulski, Chicago; Charles N. Lynk, Jr., Arlington Heights; James J. Mikulski, Deerfield; John F. Mitchell, Elmhurst; Roy A. Richardson, Skokie; John H. Sangster, Hoffman Estates, all of Ill.

[73] Assignee: Motorola, Inc., Chicago, Ill.

[22] Filed: Oct. 17, 1973

[21] Appl. No.: 403,725

[52] U.S. Cl. .................................. 179/41 A; 325/16
[51] Int. Cl. .............................................. H04q 7/00
[58] Field of Search ......... 179/41 A; 325/16, 55, 64

[56] References Cited

UNITED STATES PATENTS

| | | | |
|---|---|---|---|
| 3,517,315 | 6/1970 | Malm | 179/41 A |
| 3,586,978 | 6/1971 | Van Gorder | 179/41 A |
| 3,663,762 | 5/1972 | Joel, Jr. | 179/41 A |
| 3,745,462 | 7/1973 | Trimble | 325/55 |

*Primary Examiner*—Kathleen H. Claffy
*Assistant Examiner*—Gerald L. Brigance
*Attorney, Agent, or Firm*—Eugene A. Parsons; James W. Gillman

[57] ABSTRACT

A portable duplex radio telephone system includes at least one base station transmitter having a predetermined base transmission range, and a plurality of portable or mobile units each having a predetermined portable maximum transmission range predeterminately shorter than the base transmission range. Satellite receivers are deployed about the base station within the base station transmission range for receiving transmissions from the portable units. The base station transmitter transmits signals on a signalling channel and on at least one communications channel. Each transmitter signalling and communications channel has a frequency that is paired or associated with a receiving frequency of the satellite receivers. In a multiple base station system, the portable receiver has means for scanning the base station transmitter signalling frequencies and for tuning the portable transmitter to the signalling frequency associated with the frequency of the strongest signalling signal received from the base transmitter. When communication is initiated, the portable transmitter and receiver are automatically retuned to one of the communications channels as determined by the strongest signalling frequency received by the portable receiver and by channel availability. Means are also provided in the system to continuously locate a portable unit and switch the operating frequency thereof as the portable unit moves between base station transmitter coverage areas. Further means are provided to automatically reduce the output power of each portable transmitter to the minimum level required for satisfactory communications in order to reduce battery drain and the interference caused by the portable transmitters.

31 Claims, 10 Drawing Figures

RADIO TELEPHONE SYSTEM

BACKGROUND FIELD OF INVENTION

This invention relates generally to communications systems, and more particularly to organized radio telephone systems having a plurality of base station and portable units, each having a predetermined coverage area, and means for adjusting the operating frequencies of the portable units to provide the optimum communications path.

PRIOR ART

Organized communications systems are known, one variety of which is commonly known as a cell system. In such a system, the geographic area to be covered is divided into a group of cells, each cell having a base station transmitter and a base station receiver. The ranges of the base and portable or mobile units are made substantially equal, and the mobile unit covers the entire geographic area covered by the base station transmitter. The base and mobile frequencies of adjoining cells are selected to be different to avoid interference between cells, and the same frequencies may be reused in cells that are suffcently spaced so as to prevent interference therebetween. Location means are provided to determine the cell in which the portable unit is operating, and to adjust the operating frequency thereof to the frequency designated for the cell in which the portable is located. The location function may be accomplished by base station receivers located in the corners of the cell which have directional antennas looking inwardly into the cell and a computer connected to the base receivers for determining the strength of the signal received from the portable unit by the corner located receivers.

Whereas this technique provides a way to achieve reasonably good communications, because the transmission range of a portable or mobile unit is equal to the coverage range of a base station, the location of the portable unit must be determined very accurately, and the assignment of the operating frequency of the portable must be based on the geographic location of the unit to avoid interference with portables in other cells operating on the same frequency. The aforementioned requirement requires complex and expensive location equipment, does not provide optimum spectrum utilization, and does not assure that the portable unit is receiving the best signal since the assignment of operating frequency is based on location and not on the strength of the signal received thereby. Furthermore, the fixed, relatively high power of the portable unit causes interference to other units in the system when the portable unit is operated at a high location, such as the upper floors of a high rise building. This occurs because the increased coverage area resulting from the improved propagation characteristics of a high antenna cause the portable unit to radiate into areas in which other portable units may be operating on the same frequency.

SUMMARY

It is an object of the present invention to provide an improved organized communications system that provides improved communications and reduced interference between units operating on the same frequency.

It is a further object of this invention to provide a communications system that makes more efficient use of the radio frequency spectrum than systems heretofore developed.

It is yet another object of the invention to provide a fully automatic portable telephone system.

In accordance with a preferred embodiment of the invention, the geographic area over which communications is to be provided is divided into a series of base station cells, and each station cell is further subdivided into a series of sub-cells. A base station transmitter is located within each cell and transmits to portable receivers within the cell. The transmission range of the portable transmitters is deliberately reduced to allow less precise location of the portable units without causing interference between the portable units. A network of satellite base station receivers, one base station receiver being located in each sub-cell, is employed to receive signals from the portable transmitters. A different set of incoming and outgoing frequencies are employed in each cell to avoid interference between units in adjacent or closely spaced cells. The same frequencies may be reused in cells that are sufficiently geographically separated from each other to prevent interference therebetween.

Each base transmitting station radiates at least one out-going signalling frequency to the sub-cells within its coverage area. The receiver in each of the portable units scans the signalling frequencies of all of the base station transmitters within its area of operation and stores an indication of which of the received signalling signals is the strongest to determine the base station transmitter that will provide the best communications link therewith. Transmissions by the portable unit are made on an incoming signalling frequency that is paired or associated with the strongest outgoing signalling frequency received. The transmission from the portable unit is received by the receivers in the nearest sub-cells and a comparison is made between the signal strength received by the various satellite receivers to determine which satellite receiver provides the best communications with the portable unit. After the optimum base station transmitter and satellite receiver have been determined, the base station transmitter signals the portable unit, on the outgoing signalling frequency, to retune to a communications channel comprising a pair of frequencies assigned to the selected base station transmitter and satellite receiver over which communication will be established.

Other scanning base station receivers are employed to monitor all active communications channels, and means are provided to compare the signal strengths received by each of the scanning receivers. Automatic switching circuitry is provided to cause the portable unit to change operating frequency and to make the necessary wire line switching as a portable proceeds from one cell to another.

Because the range of each portable unit is less than the range of a base station transmitter, the frequencies at which the portable unit operates may be chosen to assure that the portable unit is receiving the best signal, regardless of whether it is actually operating within the particular cell to which those frequencies have been assigned, without causing interference to the rest of the system. The aforementioned feature assures that the best possible communications link is provided, eliminates the need for precise geographic location of each individual portable unit and makes more efficient use of the radio frequency spectrum.

To further improve the interference protection between closely spaced cells, and to reduce the portable unit battery drain, an automatic output control system is provided within each portable transmitter to maintain the transmitter output power at the minimum level required for reliable communications. The automatic output control system further provides the portable unit with vertical mobility by automatically reducing the output power thereof when its coverage area increases as a result of operation from a high location, thereby preventing interference with other portable units operating on the same frequency. In addition, frequency offsets may be provided between cells reusing the same frequencies to provide additional co-channel protection without reducing the frequency separation between channels used in adjacent cells.

DETAILED DESCRIPTION

Figure 1:
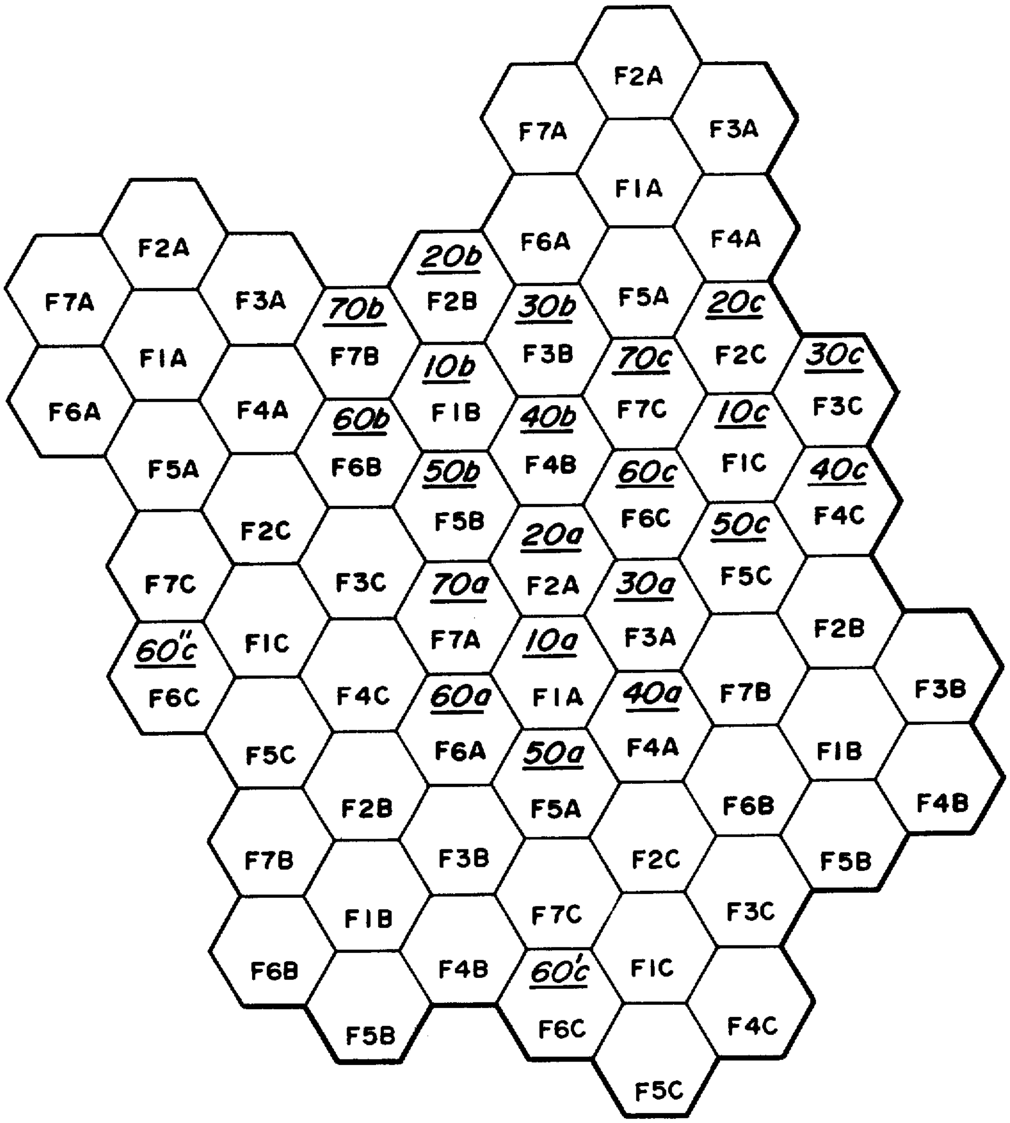
FIG. 1 is a plan view of the organization of the radio telephone system according to the invention, assuming uniform propagation, and showing the allocation of frequencies to the various cells.

Referring to FIG. 1, there is shown a plan view of a frequency allocation scheme, according to the invention, usable with mobile or portable radio or radio telephone systems. The geographic area to be covered is divided into a plurality of cell groups, each group containing a predetermined number of cells. The number of cells in each group is determined by the following equation:

$$N = i^2 + j^2 + ij$$

where N represents the number of cells in each cell group and $i$ and $j$ may be any integers. In the system shown in FIG. 1, $i$ is equal to 2 and $j$ is equal to 1 to provide a seven cell group, however, other values of $i$ and $j$ may be selected to provide different patterns.

In FIG. 1, each of the cells 10*a*, 20*a*, 30*a*, 40*a*, 50*a*, 60*a* and 70*a* has a base station transmitter and at least one base station receiver located therein. Each base station transmitter is allocated at least one outgoing signalling frequency and at least one outgoing communications frequency, while each base station receiver is allocated at least one incoming signalling frequency and one incoming communications frequency, each incoming frequency being paired with an outgoing frequency to provide a full duplex channel. The duplex channel sets allocated to each of the cells 10*a*, 20*a*, 30*a*, 40*a*, 50*a*, 60*a*, and 70*a* are denoted as F1A-F7A, respectively. In a typical system, employing frequency modulation and ± 5 KHz deviation, a 25 KHz separation between frequencies used within a cell group has been found to provide adequate protection from adjacent channel interference.

In a cell system of the type illustrated in FIG. 1, the frequencies F1A-F7A may be reused in other cell groups that have sufficient geographic separation therebetween to substantially eliminate co-channel interference. For example, the frequencies F1A-F7A may be reused in the cell group comprising cells 10*b*, 20*b*, 30*b*, 40*b*, 50*b*, 60*b*, and 70*b*, respectively, and in the group comprising cells 10*c*, 20*c*, 30*c*, 40*c*, 50*c*, 60*c* and 70*c*, the cells having the same numerical prefixes being assigned the same group of frequencies. However, prior art systems employing groups of seven cells each and reusing the frequencies in each seven cell group have been found to provide marginal co-channel interference protection. Accordingly, systems have been designed using larger cell groups, such as, for example, twenty-one cells per group, and allocating different frequencies to each of the twenty-one cells in the group. Unfortunately, the allocation of twenty-one different frequency sets is wasteful of the radio frequency spectrum, a twenty-one cell group requiring three times the spectrum of a seven cell group.

The frequency allocation concept of the present invention has recognized the fact that cells that are not adjacent to each other geographically, such as cells 10*a*, 10*b* and 10*c* do not require a 25 KHz separation between frequencies assigned thereto because of the geographic spacing therebetween. Accordingly, frequencies assigned to cells having similar numeric prefixes in FIG. 1 may be assigned channels that are spaced much less than 25 KHz apart while maintaining adequate interference protection.

For example, in the system of FIG. 1, each of the frequency sets F1B-F7B, assigned to cells 10*b*, 20*b*, 30*b*, 40*b*, 50*b*, 60*b* and 70*b* may be spaced only 8.33 KHz from one of the frequency sets F1A-F7A, respectively. Similarly, the frequency sets F1C-F7C assigned to the cells 10*c*, 20*c*, 30*c*, 40*c*, 50*c*, 60*c* and 70*c* need be spaced only 8.33 KHz from the frequency sets F1A-F7A and F1B-F7B, respectively. The above described interleaved frequency allocation system provides improved co-channel interference protection over that provided by a normal seven cell system while maintaining the spectrum economy of a seven cell system. The offset system may be adapted to any cell group having any number of cells, and the criteria for determining the frequency offset between cell groups of such a system is described later in the application.

Figure 1A:
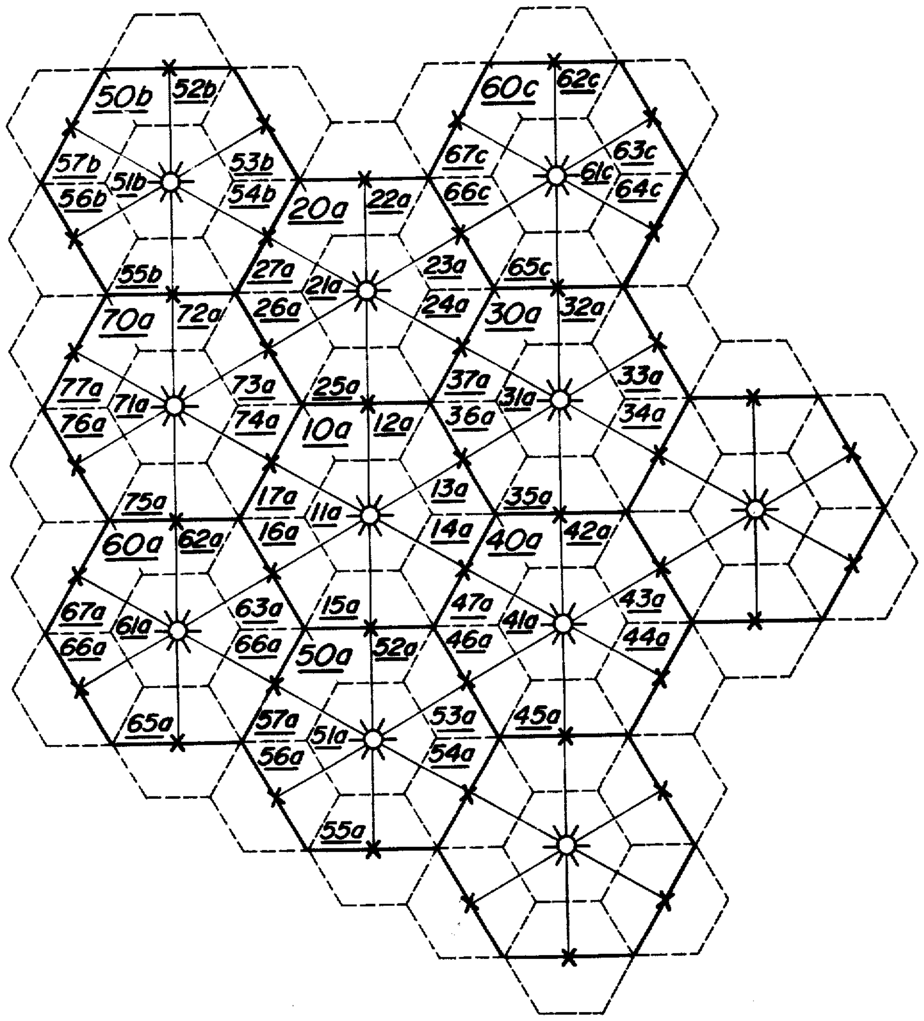
FIG. 1*a* is a more detailed plan view of some of the cells of the system of FIG. 1 showing the division of the cells into sub-cells and the location of base station and receiver sites therein.

Referring to FIG. 1*a*, there is shown a more detailed drawing of the cell structure of FIG. 1. Although the frequency allocation scheme of FIG. 1 may be used in systems employing a single base station transmitter and receiver per cell, and a mobile unit having the same range as a base station, in a preferred embodiment, the system according to the invention uses a base station transmitter having a coverage range which covers the entire cell, a portable unit having a coverage area smaller than that of the base station transmitter and a plurality of receiver sites deployed within each cell.

In FIG. 1*a*, the receiver sites are denoted by crosses and the combination receiver-transmitter base station sites are denoted by circles. The radially extending lines about the circles denote directional antennas for portable unit locating receivers, the function of which will be explained in a subsequent portion of this application. Each of the cells is divided into a group of sub-cells, for example, the cell 10*a* is divided into the sub-cells 11*a*-17*a*, the cell 20*a* into sub-cells 21*a*-27*a*, etc. Each base station site transmits and receives on duplex channels assigned to the cell in which the base station is located. For example, the base station site in the cell 10*a* transmits and receives on the frequencies in the set F1A, the base station site in the cell 20*a* transmits and receives on the channels in the set F2A and the base station site located in the cell 30*a* transmits and receives on the channels in the set F3A.

Because the range of a portable unit is intentionally made smaller than the range of the base station transmitter, receiver sites in addition to the receiver located in the base station must be deployed within each cell to receive transmissions from portable units. The receiver sites are denoted by crosses, and are connected to the base station sites by means of wire telephone lines or other voice grade interconnections. Each receiver site, in the present embodiment, is located near the edge of the cell and receives signals from portable units in two adjoining cells. The coverage area of each of the receiver sites is indicated in FIG. 1*a* by a hexagonal dashed line sub-cell about each receiver site. Each cell is divided into seven sub-cells, one about the base station site, and six about the six receiver sites. For example, the cell 10*a* is divided into sub-cells 11*a*-17*a*, the cell 20*a* into sub-cells 21*a*-27*a* and the cell 30*a* into sub-cells 31*a*-37*a*. Of the aforementioned sub-cells, only the sub-cells 11*a*, 21*a* and 31*a* are contained entirely within their respective cells. The remaining sub-cells overlap two cells. For example, the sub-cell 13*a* of cell 10*a* overlaps the sub-cell 36*a* of cell 30*a*. Accordingly, the receiver site located at the boundary of cells 10*a* and 30*a* must be capable of receiving signals on all of the frequencies F1A and F3A assigned to cells 10*a* and 30*a*, respectively. Similarly, each of the receiver sites located at a cell boundary must be capable of receiving signals on frequencies assigned to both cells adjoining the boundary. The base station sites need only transmit and receive on frequencies assigned to the cells in which they are located for purpose of communication, however, directional antennas and receivers for monitoring all active communications channels are employed at the base station sites for monitoring the activity of the portable units and for reassigning communications channels and land lines, as necessary, as the portable units move between cells and sub-cells.

Figure 2:
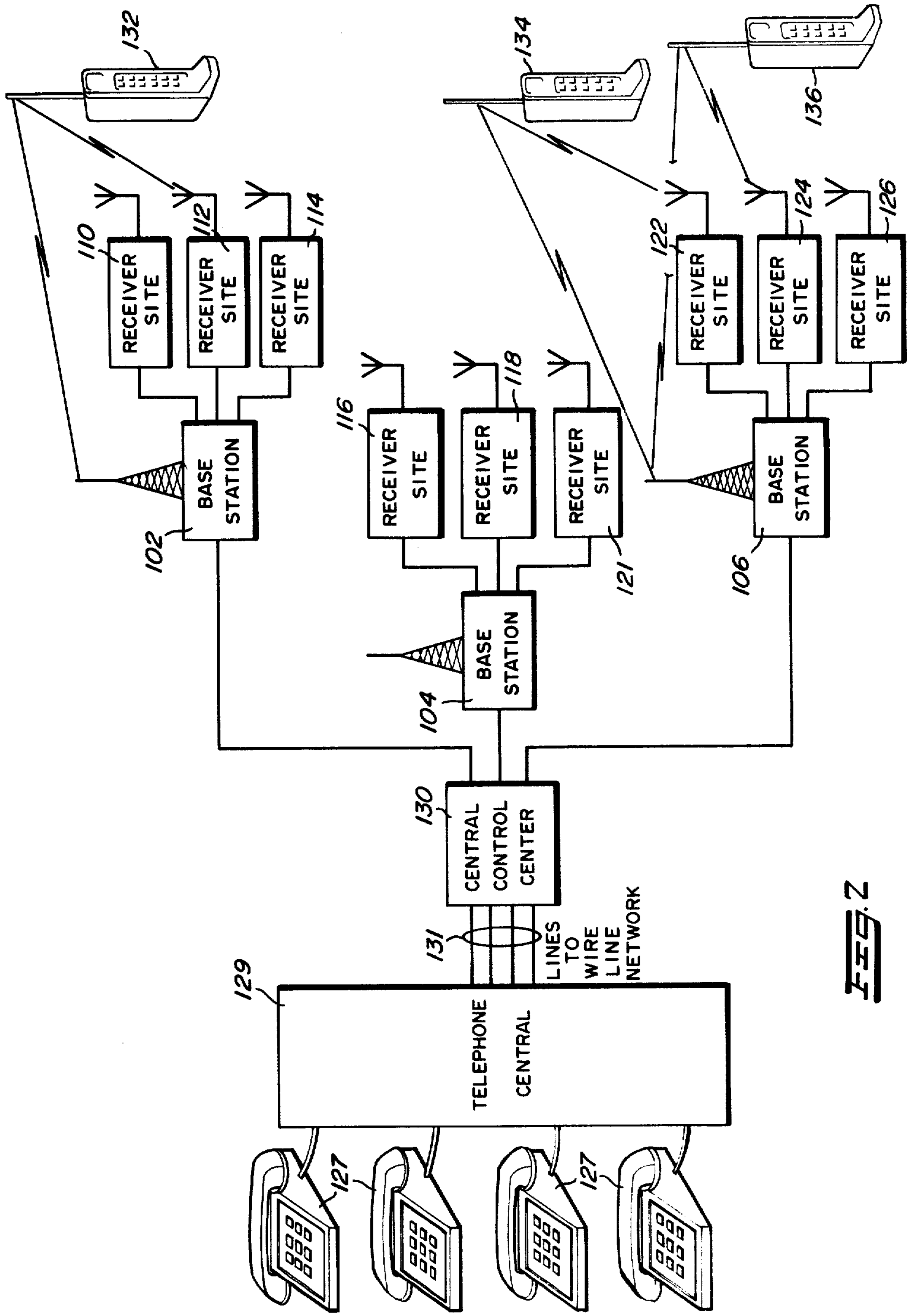
FIG. 2 is a partial block diagram of the portable radio telephone system showing the operation thereof.

Referring to FIG. 2, there is shown a block diagram showing the interconnections between the base station transmitter and receiver sites and the portable units which communicate with the system. Three base stations 102, 104 and 106 are shown. Each of the base stations 102, 104 and 106 contains a transmitter and a receiver and corresponds to one of the transmitter-receiver sites denoted by circles in FIG. 1*a*, such as, for example, the circles shown in cells 11, 21 and 31. Only three base stations are shown for purposes of simplicity, however any number may be used depending on the size of the area to be covered. The base station 102 has three receiver sites 110, 112 and 114 connected thereto. Similarly, receiver sites 116, 118 and 120 are connected to the base station 104, and the receiver sites 122, 124 and 126 are connected to the base station 106. The receiver sites correspond to the crosses shown in FIG. 1*a*. The number of receiver sites connected to each base station is determined by the number of sub-cells in each cell, and six receiver sites would be required for each base station for a seven cell group such as the one shown in FIG. 1*a*, however, only three receiver sites have been shown in FIG. 2 to avoid unnecessarily complicating the drawing.

Each of the base stations 102, 104 and 106 is further connected to a central control center 130 which is also connected to a standard wire line telephone network via lines 131. The lines 131 provide a connection to a plurality of fixed telephones 127 via a telephone central 129. Three portable units 132, 134 and 136, each containing a transmitter and a receiver for communicating with the base station and receiver site network are shown. Whereas only three portable units are shown, the actual number which may be used in a practical system is limited only by the number of base station and receiver sites in the system, and the number of frequencies allocated to the system.

In operation, outgoing messages are transmitted from a base station, such as the base station 102, to a portable unit, such as the unit 132. Incoming messages from the portable unit 132 are received by a receiver site such as the receiver site 112 and routed to the base station 102 and the central control center 130. The central control center 130 connects the base station 102 to either the wire line telephone network or to another base station, such as base station 106, depending upon whether communication with a fixed or portable telephone is desired.

In the system of the instant invention, the transmission range of the base station is intentionally made greater than the transmission range of a portable unit. To provide two-way communications, the base station transmitter transmits directly to the receiver in the portable unit, and the portable unit transmitter transmits to the base station receiver or to one of the receiver sites deployed within the coverage area of the base station. The transmission range of the portable unit is intentionally limited because, unlike a base station, a portable may move between areas and interfere with other portable transmissions in areas using the same frequency.

Prior art systems, in which the range of the base and protable units were fixed and equal, sought to control the portable interference problem by accurately locating the portable within a given cell and assigning a transmission frequency to the portable based on its geographic location. The assignment of a portable transmission frequency based upon geographic area reduces portable interference to an acceptable level, however, it does not provide the portable unit with vertical mobility, and it does not assure that the best communications channel is provided, because due to terrain and other factors, the best communication often occurs with a base station located outside of the cell in which the portable is located. Furthermore, the location equipment necessary to locate a portable accurately enough to avoid interference is rather costly, and optimum spectrum utilization is not achieved.

By limiting the transmission range of a portable unit to less than the transmission range of a base station, and by deploying receiver sites about each base station to receive transmissions from the portable unit, the output power of the portable unit may be sufficiently reduced to allow less accurate location of the unit without causing interference with other portables operating at the same frequency.

The signal to interference ratio between units operating on the same frequency is expressed by the following equation:

$$\frac{S}{I} = K \log \left(\frac{D}{R} - 1\right)$$

where S/I is the signal to interference ratio, D is the distance between stations operating on the same frequency, and K is a constant. From the above equation, it can be seen that reducing the range of a portable unit reduces R, thereby improving the signal to interference ratio and allowing portable units operating on the same channel to operate closer together. Because the portable units may now be allowed to operate more closely together without causing excessive interference, the transmission frequency of each portable unit can be assigned to provide the best communications link rather than being arbitrarily assigned on a geographic basis.

Following is a description of the steps involved in determining the best transmission and reception frequency for a portable unit. Each base station within a predetermined geographic area wherein co-channel interference may occur transmits a signal on a different outgoing signalling frequency. Each base station transmitter also is capable of transmitting signals on different voice channels, also commonly referred to as information or communication channels. The receiver in each portable unit is automatically tunable to receive signals on any one of the signalling or voice channels transmitted by any of the base stations in the area. Each portable unit is also capable of transmitting a signal on different incoming signalling and voice channels, each incoming channel being paired or associated with one of the outgoing channels, but having a different frequency than the outgoing channel to allow duplex operation. The receivers located in the base station and in the receiver sites are capable of receiving signals on the signalling channel that is paired with the outgoing signalling channel of the base station transmitter in the cell in which the receivers are located. Each of the receivers is also capable of receiving signals on each of the incoming voice channel frequencies paired with the outgoing voice channel frequencies assigned to the base station transmitters associated with the particular receiver site.

Referring to FIGS. 1*a* and 2, in operation, each of the base station transmitters continuously sends all signalling information on its signalling channel. The receiver in each portable unit continuously scans the outgoing signalling channels, measures the strength of the signal received on each of the signalling channels, and stores information indicating which of the signalling channels is the strongest. The strongest signalling channel is generally the signalling channel assigned to the base transmitter that is nearest the portable unit. For example, if the portable unit were located in the sub-cell 23*a* of FIG. 1*a*, the strongest signalling channel would be the signalling channel of the transmitter located in sub-cell 21*a*, however, due to shadowing or interference, the strongest received signalling channel received could also be one transmitted by a transmitter in sub-cell 61*c* or sub-cell 31*a*.

When transmission is initiated by the portable unit, logic within the portable unit tunes the transmitter thereof to the incoming signalling frequency that is paired with the strongest received outgoing signalling frequency. The transmission from the portable unit is received by one or more receivers located in a base station or receiver site, and the signal strength of the incoming signal is monitored by the system to determine which fixed receiver is receiving the strongest signal. In the aforementioned example, for a portable located within the sub-cell 23*a*, the strongest incoming signal would most likely be received by the receiver site located in sub-cell 23*a*, however, due to transmission irregularities, it is also possible that the strongest signal would be received by a receiver in one of the adjoining cells, such as sub-cell 22*a*.

If the receiver in sub-cell 23*a* receives the strongest signal, the central control center 130 causes the base station transmitter in sub-cell 21*a* to transmit a signal on an outgoing signalling frequency assigned to the cell 20*a* to the portable unit to cause the portable unit to automatically retune its transmitter and receiver to a frequency pair selected from the group of frequencies F2A assigned to cell 20*a*. At the same time a land communications link would be established between the base station in sub-cell 21*a* and the receiver site in sub-cell 23*a*. If the strongest signal had been received by the receiver located in sub-cell 22*a*, the portable unit would have been assigned the same pair of frequencies from the group F2A but the signal received by the receiver site in sub-cell 22*a* would be relayed to the base station in sub-cell 21*a* even though the portable unit is physically located within sub-cell 23*a* to assure that the best communication channel is provided.

If the portable unit located within the sub-cell 23*a* had received the strongest signalling channel signal from the base station transmitter located in sub-cell 61*c*, the operating frequency of the portable unit would have been tuned to one of the frequencies F6C assigned to the cell 60*c*. A land communications link would be established between the base station transmitter located in the sub-cell 61*c* and the receiver site located in sub-cell 66*c* (assuming that the receiver site in sub-cell 66*c* receives the strongest signal from the portable unit). Since the coverage area of a portable unit is approximately equal to the size of one sub-cell, and since the nearest reuse of any frequency used in the cell 60*c* is in the cells 60′*c* and 60″*c* (see FIG. 1) the assignment of a cell 60*c* frequency to a portable unit operating in cell 20*a* will not cause interference to any portable unit operating elsewhere on the same frequency, such as in cell 60′*c* or 60″*c*.

Once the initial voice frequency pair has been assigned to a portable unit, the location of the unit must be continuously monitored in order that new communications channel frequencies may be assigned thereto as required when the portable unit moves between cells. The location function is provided by a group of receivers located at the base station sites which monitor all of the active voice or communications channels. Directional antennas may be employed at each base station site in order that the direction from which the strongest signal is being received may be ascertained. For example, the base station in the cell 30*a* of FIG. 1*a* employs an antenna array (denoted by the six radially extending lines) which has six lobes, each lobe covering a portion of the sub-cell 31*a* and one of the outer sub-cells 32*a*-37*a*. The other cells also utilize similar antenna arrays, each lobe covering a portion of the central sub-cell and one of the outer sub-cells.

Each directional antenna is connected to either a plurality of receivers or to a single scanning receiver that may be rapidly tuned to any incoming voice frequency assigned to any nearby cell. Each receiver includes means for determining the strength of the signal received, and is connected, either directly or indirectly to a central control center, such as the central control center 130. The control center determines the location of each portable unit based on the signal strength received by the location receivers, and initiates a reassignment of the portable communication channel as the portable unit moves from one cell to another.

In operation, assume that the unit had been located in the cell 10*a* when the call was initiated, and had been assigned a voice channel from the frequency group F1A. The voice channel assigned to the portable unit from the group F1A now becomes an active voice channel and is scanned by the location receivers located in cells 10*a*, 20*a*, 30*a*, 40*a*, 50*a*, 60*a*, and 70*a*. If the portable unit moves from cell 10*a*, towards cell 20*a*, the signals received by the antennas covering cell 10*a* will decrease and the signals received by the antennas covering the cell 20*a* will increase. The strength of the signals is compared by the central control unit 130, and when the signal received by an antenna covering the cell 20*a* exceeds the signal received by the antenna covering cell 10*a* by a predetermined amount, the base station located in cell 10*a* transmits a command (on the voice channel) to the portable unit to assign a new voice channel from the group F2A thereto. The central control unit also automatically switches the wire land lines from the base station transmitter and receiver site located in cell 10*a* to the base station transmitter and the receiver site located in cell 20*a* that is receiving the strongest signal. In a similar fashion, had the portable unit moved from cell 10*a* to cell 30*a*, the signal received by the antenna covering cell 30*a* whould have increased, and a voice channel from the group F3A would have been assigned. Had the unit only moved between sub-cells within a cell, such as between sub-cell 22*a* and 23*a*, there would be no frequency reassignment, but only a switching of the wire land lines from the receiver site in sub-cell 22*a* to the receiver site in sub-cell 23*a*. As in the case of the initial location and frequency assignment, due to the limited power of the portable unit, the location need not be precise and a portable unit operating in one cell may be assigned a frequency from an adjoining cell without causing interference to the rest of the system.

In order to provide for further interference protection and to reduce the battery drain of the portable unit, an automatic output control feature is also provided. The automatic output control feature also provides the portable unit with vertical mobility by reducing its output power when its transmission range increases as a result of being operated at a high point such as the upper stories of a high rise building. To provide the automatic output control feature, each base receiver in the system is equipped with circuitry for monitoring the absolute level of the incoming signals received from the portable units. If the signal received by any receiver exceeds a predetermined level which has been determined to be adequate to provide good communications, the base station transmitter sends a command to the portable unit to cause the portable unit to reduce its power until the signal received by the receiver is reduced to the minimum required for satisfactory communications.

The automatic output control may be provided in a variety of ways, for example, the transmitter transmitting a tone to the portable unit when the power is excessive, and the portable unit being responsive to the tone to gradually reduce the power to an acceptable level, at which point the transmission of the tone is terminated. A dynamic system may be provided by providing circuitry within the portable unit which gradually increases the output power when a tone is absent and gradually decreases the output power in the presence of a tone, thereby assuring that the output power is always maintained at an optimum level.

The organization of the system of the present invention provides for a considerable saving in the amount of radio spectrum used. It has been found that in a normal unorganized FM two-way radio system such as the type used by police and business services, a 25 KHz spacing between channels provides adequate adjacent channel interference protection. The aforementioned 25 KHz channel separation has been designed to provide adjacent channel interference protection to a receiver located near an adjacent channel transmitter, and attempting to receive signals from a distant transmitter on its channel, this being a worst case condition that does not occur in organized systems. However, prior art cell systems have used channel spacings that have been designed for uncontrolled systems thereby resulting in an excessive spacing between channels and a consequent waste of the radio spectrum. The applicants have recognized that in an organized system, the situation of a portable unit being located close to an adjacent channel transmitter while attempting to receive a signal from a distant on-channel transmitter never occurs because of the geographic organization of the system, and as a result of the protection provided by the geographic organization of the system, the amount of protection that need be provided by frequency separation can be reduced.

The aforementioned concepts may be specifically implemented in the system of FIG. 1 as follows. The channel separation between adjacent cells of each group need be no more than 25 KHz to provide a total spectrum 175 KHz for a requirement of 7 × 25 KHz or a basic channel set in each seven cell group. A basic channel set is defined as one channel out of each frequency set from each cell within a cell group, such as, for example, one channel from each of the frequency sets F1A-F7A from the cell group comprising cells 10*a*, 20*a*, 30*a*, 40*a*, 50*a*, 60*a* and 70*a* in FIG. 1. No more than 25 KHz separation between channels is necessary because, even though the cells are geographically adjacent to each other, the situation in which a portable unit is located near a strong adjacent channel transmitter while trying to receive signals from a distant on-channel transmitter never arises. Consequently, the spacing may even be somewhat less than 25 KHz. The spacing between adjacent frequency channels in each individual cell also need not be more than 25 KHz, however, in practical systems it may be more than 25 KHz because the 25 KHz spaced channel will generally be used in an adjacent cell. Because the geographic separation between cells in different cell groups provides additional interference protection, the frequency spacing between channels in cells of different cell groups need not be 25 KHz but may be considerably less. For example, where three different groups of frequencies FA, FB and FC are used, each containing frequencies F1A-F7A, F1B-F7B and F1C-F7C, respectively, the frequency separation need be only one third of 25 KHz, or 8.33 KHz. Hence, a channel in a particular cell in one cell group, such as cell 10*a*, is separated from a corresponding channel in a corresponding cell, such as cell 10*b*, of a different cell group by only 8.33 KHz. The remaining interference protection is provided by the geographic separation between the cells of the different groups. As a result, twenty-one frequencies for twenty-one different cells are provided by the basic 175 KHz spectrum.

The same basic idea may be applied to any number of cells. This is accomplished by first determining the number of cells in each cell group and the amount of spectrum to be allocated to a basic channel set, and dividing the spectrum by the number of cells in each group to provide the channel spacing between cells in a group. Since co-channel interference between cells in different cell groups is the limiting case in practical systems, the number of cell groups using different frequencies must be determined. This can be done using propagation measurements and calculations. Once the number of different cell groups has been determined, the spacing between frequencies in adjacent cell groups can be determined by dividing the basic channel spectrum by the total number of cells in all of the different cell groups.

In the example illustrated in FIG. 1, the basic channel set requires 175 KHz of spectrum, and the frequency separation between cells in a given cell group is 175 KHz divided by seven (for a seven cell pattern) or 25 KHz. The separation between frequencies in cells from different groups is 175 KHz divided by twenty-one (three groups of seven cells each) or 8.33 KHz. The twenty-one cell pattern has been found to work well, however, other patterns are also possible.

The discussion up to this point showing the layout of the system has used hexagonally shaped cells to illustrate the concepts of the invention; however, such regularly shaped cells would only be used in an ideal environment having uniform transmission characteristics and a lack of interference from other sources of electromagnetic radiation. In a practical system, the coverage provided by each base station and receiver site varies drastically depending on the environment, and the system would be tailored to provide base stations and receiver sites wherever necessary as determined by the environment.

Figure 3:
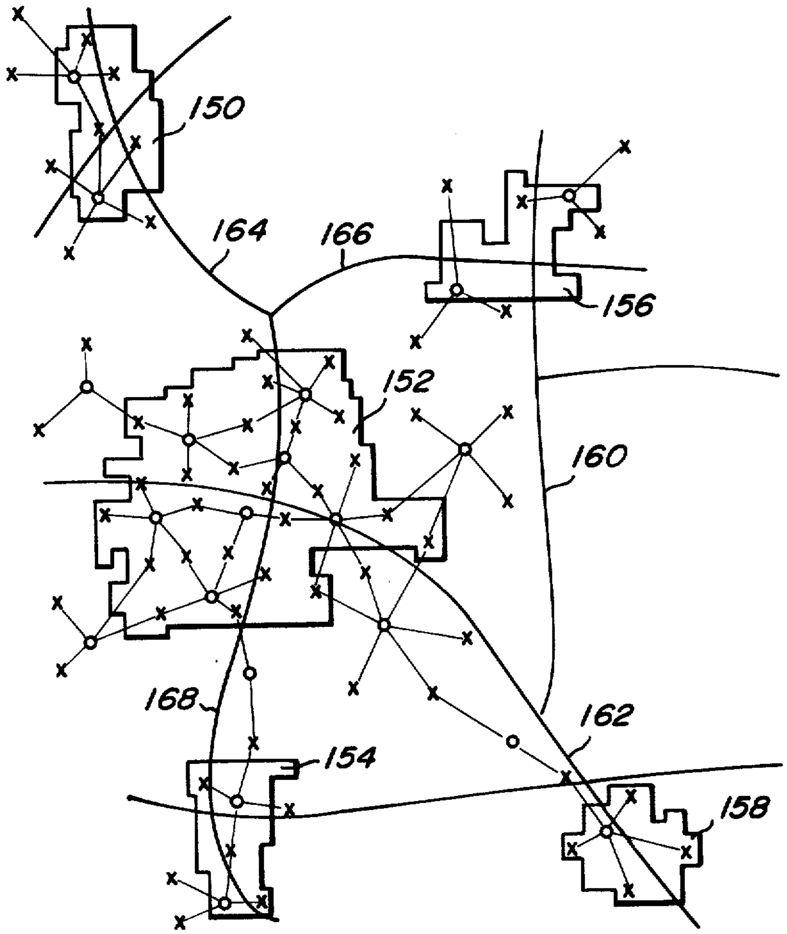
FIG. 3 is a plan view of the organization of a practical radio telephone system according to the invention showing the variation in spacing between base stations and receiver sites encountered in a typical practical mixed urban and rural area.

FIG. 3 shows the layout of a typical practical system according to the invention. The areas 150, 152, 154, 156 and 158 indicate urban areas, the rest of the area being rural or suburban. Highways 160, 162, 164, 166 and 168 interconnect the various urban areas. The urban area 152 is the largest and most densely populated area of FIG. 3, and accordingly has the highest concentration of base stations and receiver sites, denoted by circles and crosses, respectively, as in FIG. 1. The spacing between the base stations and receiver sites is small due to the large number of users and the shadowing effects of tall buildings generally present in large urban areas. The spacing between sites in the non-urban areas and in small urban areas such as area 156 is considerably greater due to the improved propagation characteristics compared to those of a densely populated urban area, and the lower population density which allows less frequent frequency re-use. Furthermore, as the number of users in an area, such as, for example, area 156, expands additional sites may be added where necessary to provide the required communications. Communications is also provided along highways, the highways 162 and 168 being served by base stations and receiver sites constructed nearby, and the highways 160 and 164 being served by extensions of the network covering urban areas 152 and 150, respectively.

Figure 4:
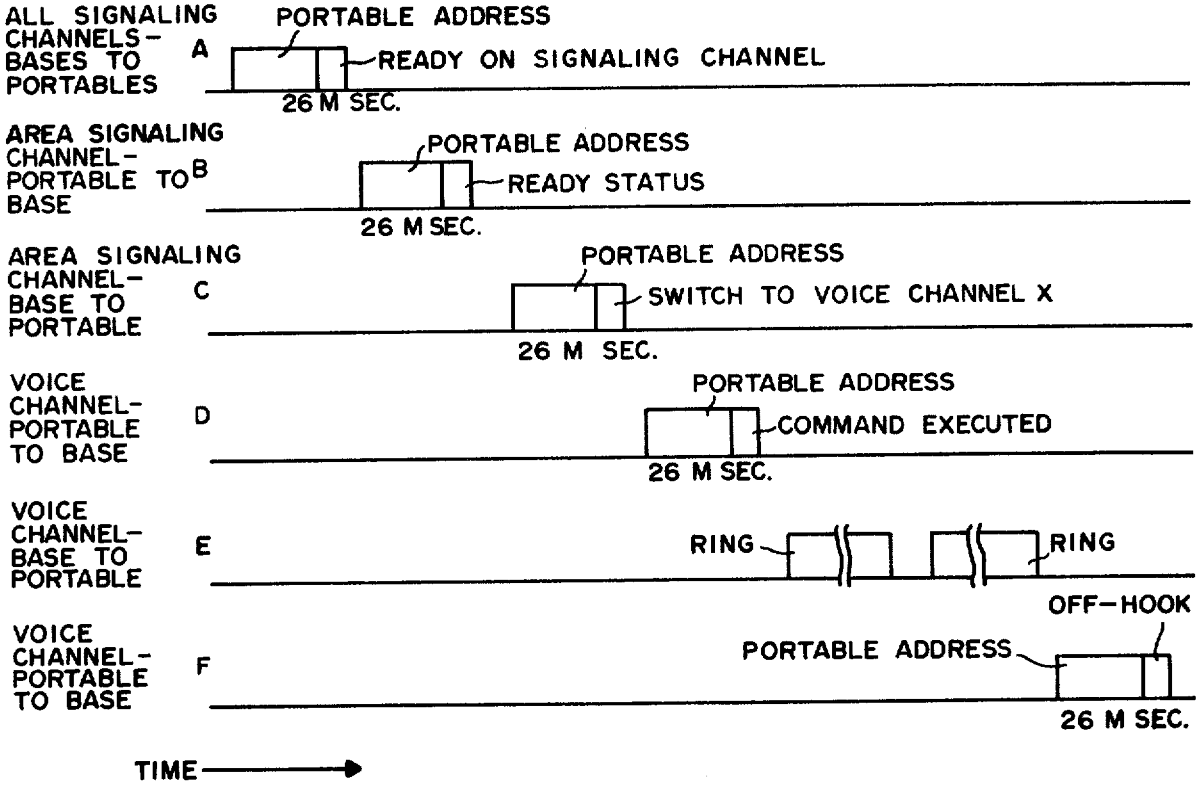
FIG. 4 is a sequence diagram showing the typical sequence of events occurring in the system according to the invention when a call is initiated by a land base telephone.

FIG. 4 shows the operation of the system, and shows, in detail, the sequence of events that happens when a call to a portable unit is initiated by a land based telephone. The telephone number dialed by the land based telephone is received by the central control center 130 which generates a portable address which corresponds to the address of the portable being called. Because, in general, the system has no way of knowing where the particular portable unit being called is located, the address of the portable unit being called is transmitted by all of the base station transmitters in the system on their respective outgoing signalling channels. Following the address of the portable, instructions are relayed to the portable unit requesting the portable unit to reply. The portable unit automatically selects the incoming signalling channel that is paired with the strongest outgoing signalling channel being received on which to reply. The last mentioned sequence of events is shown on line A of FIG. 4. As shown on line B, the portable then replies by transmitting its address and a "ready" message on the incoming signalling channel corresponding to the strongest outgoing signalling channel received. The reply is received by the system, which then determines which receiver site has received the strongest signal. Based on this information, the system can determine in what area the portable is located and transmits instructions on the outgoing signalling channel assigned to that area to the portable to switch to a voice channel assigned to that area. This action is shown on line C. The portable unit acknowledges receipt of the command by transmitting its address and a "command executed" signal on the assigned incoming voice channel as shown on line D. Upon receipt of the "command executed" signal, a ringing signal (line E) is sent to the portable unit on the assigned voice channel to initiate ringing. Raising the portable receiver off hook generates a signal consisting of the portable address and an "off hook" signal, which is transmitted to the system to terminate the ringing, as shown on line F.

Figure 5:
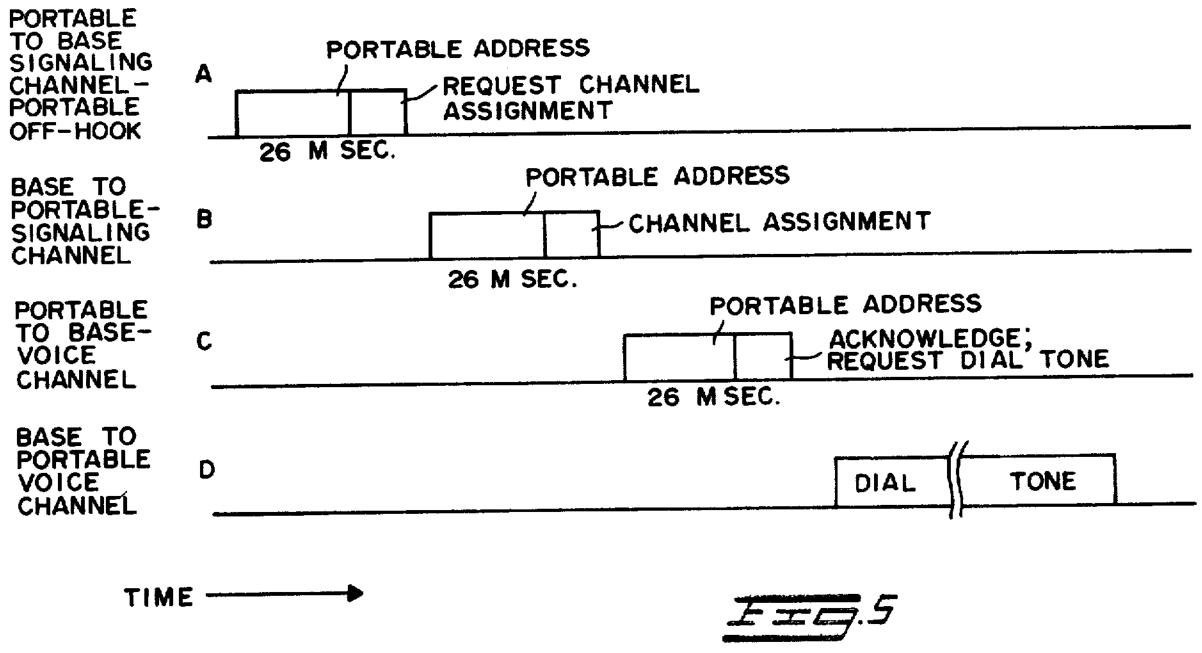
FIG. 5 is a sequence diagram showing the sequence of events occurring during a portable unit initiated call.

The sequence of events for a portable initiated call is shown in FIG. 5. The sequence is less complex because in a portable initiated call, there is no need to transmit signals over the entire area to locate the portable. The sequence begins at line A when the portable unit goes off hook and transmits its address and a message requesting channel assignment on the incoming signalling channel paired with the strongest outgoing signalling channel it has monitored. The request for a channel assignment is received by the system, which determines which site is receiving the strongest signal and assigns a voice channel (line B) used in the area associated with that site and the signalling channel to the portable unit. The channel assignment is acknowledged by the portable, which transmits its address and a request for dial tone on the assigned voice channel, as shown on line C. The base station then responds on the voice channel by supplying a dial tone (line D), whereupon the system is ready to accept dialing information. The dialing information is sent by pushing buttons on the portable unit to generate the standard Bell System tone signalling frequencies. The tones are received by the land lines network and processed in a fashion similar to the processing of normal land initiated dialing signals. Based upon the particular number dialed, the receiver site and base station communicating with the portable unit are connected to either a land based telephone or to another base station and receiver site to provide communications with another portable unit.

Figure 6:
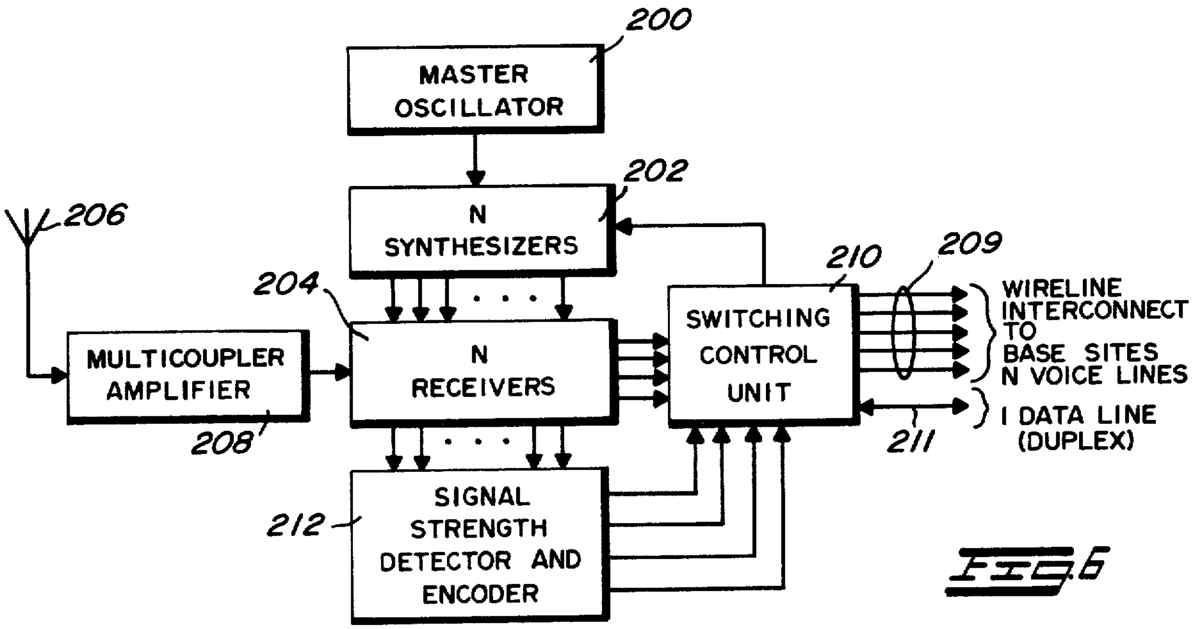
FIG. 6 is a block diagram of one of the remote receiver sites, indicated by crosses in FIGS. 1 and 3, of the system according to the invention.

FIGS. 6–9 are block diagrams showing the structure of the base and portable sites, and the interconnections and logic therebetween. Referring to FIG. 6, there is shown a block diagram of one of the remote receiver sites, such as, for example, the receiver site 110 in FIG. 2. A master oscillator 200 generates a stable frequency reference for a plurality of synthesizers 202. Each of the synthesizers generates a local oscillator signal for one of a plurality of receivers 204 connected thereto, each receiver being tuned to receive signals on the signalling and voice channels assigned to the cell in which the receiver site is located. The signals are received by an antenna 206 and applied to a multi-coupler amplifier 208 which applies the received signal to each of the receivers 204. The outputs of the receivers 204 are connected to a switching control unit 210 which applies the output signals from the receivers 204 to wire lines 209 interconnecting the receiver sites and the base stations. A signal strength detector and encoder 212 receives information from each of the receivers 204 indicative of the strength of the signals received thereby, and encodes the signal strength information to provide a signal strength indicative signal having a bandwidth that is compatible with the band-width of a telephone line. The outputs of the signal strength detector and encoder 212 are connected to the switching control unit 210 which applies the signal strength indicative signals to a data line 211 for transmission to a base station site.

Figure 7:
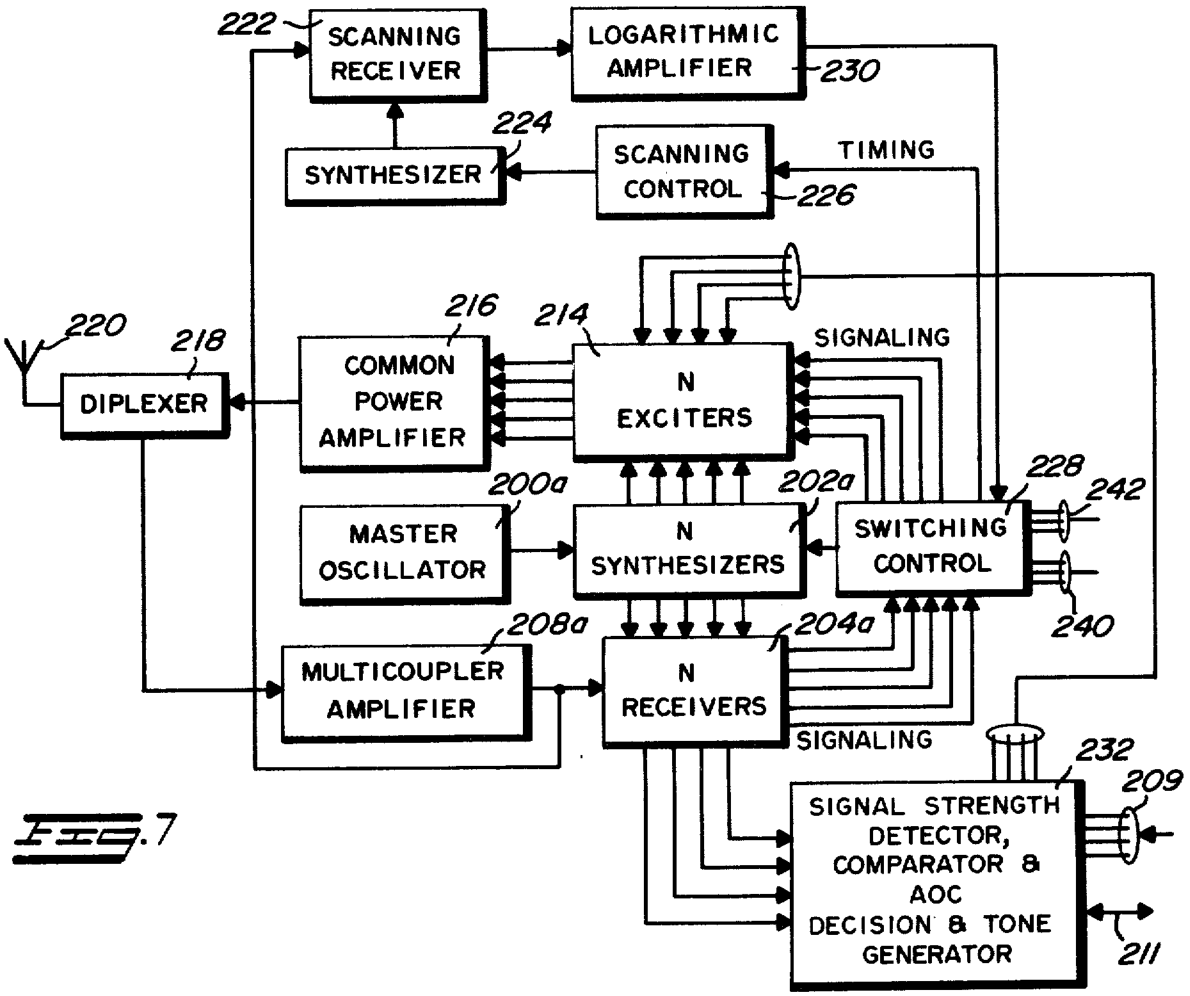
FIG. 7 is a block diagram of one of the base stations indicated by circles in FIGS. 1 and 3.

Referring to FIG. 7, there is shown a block diagram of one of the base stations in the system, such as, for example, the base station 102 of FIG. 2. The base station site contains a plurality of receivers similar to the receivers located in the remote sites of FIG. 6. The receivers are indicated by the blocks 200*a*, 202*a*, 204*a* and 208*a*, which provide functions analogous to the functions provided by the blocks 200, 202, 204 and 208, respectively, of FIG. 6. In addition to providing local oscillator signals to the receivers 204*a*, the synthesizers 202*a* also provide reference signals for a plurality of exciters 214 connected thereto. Each local oscillator signal applied to one of the receivers 204*a* has a companion signal paired therewith applied to one of the exciters 214 to provide a full duplex channel. The outputs from the exciters 214 are applied to a common power amplifier 216 which amplifies each of the exciter signals to a level suitable for transmission.

Because of the nature of the overall system, wherein each portable receiver is assured of receiving the strongest signal in its area, a common power amplifier is practical because the intermodulation components generated thereby will always be smaller than the magnitude of the desired signal being received. In prior art systems wherein voice channels are assigned on the basis of geographic location rather than signal strength, the portable unit is not assured of receiving the strongest communications channel, and separate power amplifiers must be used to prevent the intermodulation components generated by a single power amplifier from exceeding the level of the signals being received by the portable units.

The output of the common power amplifier 216 is coupled to a diplexer 218 which applies the amplified signal to an antenna 220 for transmission thereby. The diplexer 218 is also connected to the multi-coupler amplifier 208*a* for coupling signals received by the antenna 220 to the multi-coupler amplifier 208*a*.

The output of the multi-coupler amplifier 208*a* is also connected to a scanning receiver 222, the purpose of which is to scan all active voice channels to provide location information concerning the location of active portables, as previously described. The scanning receiver 222 is tuned by a synthesizer 224 connected thereto which provides local oscillator signals to the scanning receiver. A scanning control circuit 226 periodically changes the output frequency of the synthesizer 224 to cause the scanning receiver 222 to scan all active voice channels. The channels scanned are determined by signals received from the switching control circuit 228 based on a signal received from the central control center 130, which monitors the active voice channels. An output signal, such as, for example, a limiter current or squelch signal is applied to a logarithmic amplifier 230 connected thereto. The output of amplifier 230 is connected to the switching control 228 which applies the signal strength indicative signal from the logarithmic amplifier 230 to the central control unit 130 for determination of the location of the active portable units.

Signals indicative of the strength of the signal received by the receivers 204*a* are applied to the signal strength detector 232, which also receives signal strength information from the satellite receiver sites. The signal strength detector 232 detects the levels of the signals received by the various receivers located in the base station and receiver sites and generates a tone for application to the exciters 214 connected thereto to modulate the exciter corresponding to a received channel having an excessive received power level. The tone is transmitted on the outgoing channel corresponding to the incoming channel having the excessive power, and causes the offending portable unit to reduce its output power to an acceptable level.

Figure 8:
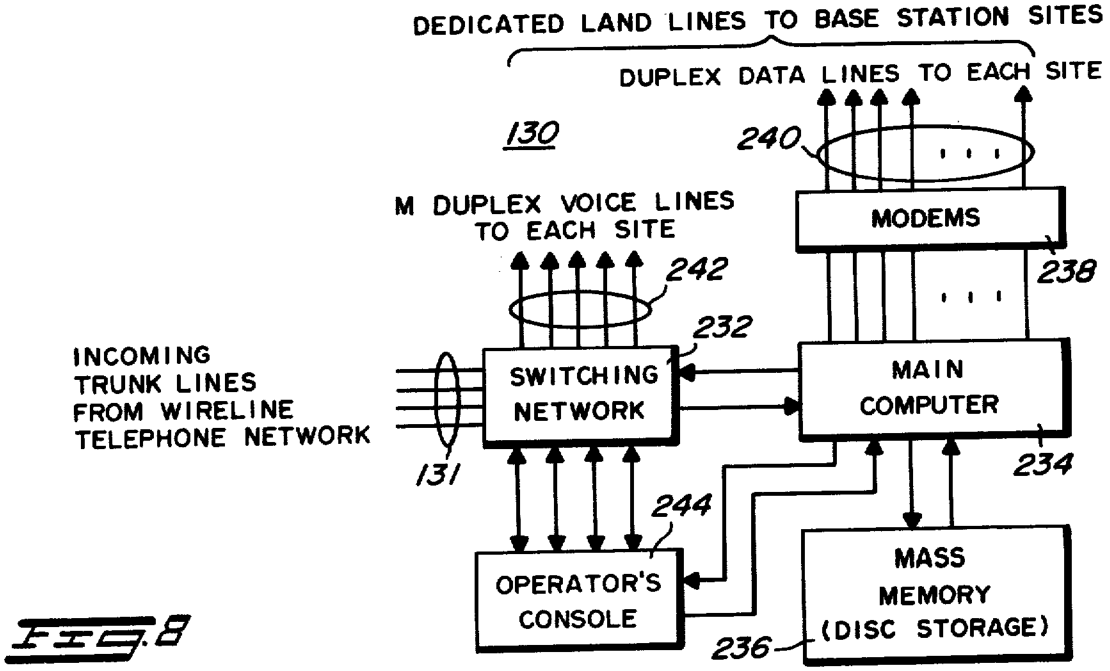
FIG. 8 is a more detailed block diagram of the central control center 130 of FIG. 2.

Referring to FIG. 8, there is shown a general block diagram of the central control center 130. Incoming wire lines 131 from a normal telephone network are connected to a switching network 232 which is also connected to a computer 234. The computer translates incoming dial pulses or tones from the wire lines 131 to corresponding portable addresses based upon the information stored in the memory 236. The stored information includes the addresses of all portable units in the area, plus the addresses of units from other areas or "roamers" which are currently operating in the area. The addresses are transmitted to the various base stations via data lines and modem 238 to allow a portable unit to be paged. Information from the base stations including signal strength data from the receiver sites and base station receivers, and address and signalling information transmitted by the portable units is received from the data lines 240 via the modem 238. The received information is applied to the main computer 234, which controls the switching network 232 to cause the switching network to connect the incoming wire lines 131 to the appropriate voice lines 242 connected to the base station sites. An operator's console 244 is provided to control the overall system, to insert and remove the addresses of "roamers" into the memory as the "roamers" enter and leave the area, and to override the computer as necessary.

Figure 9:
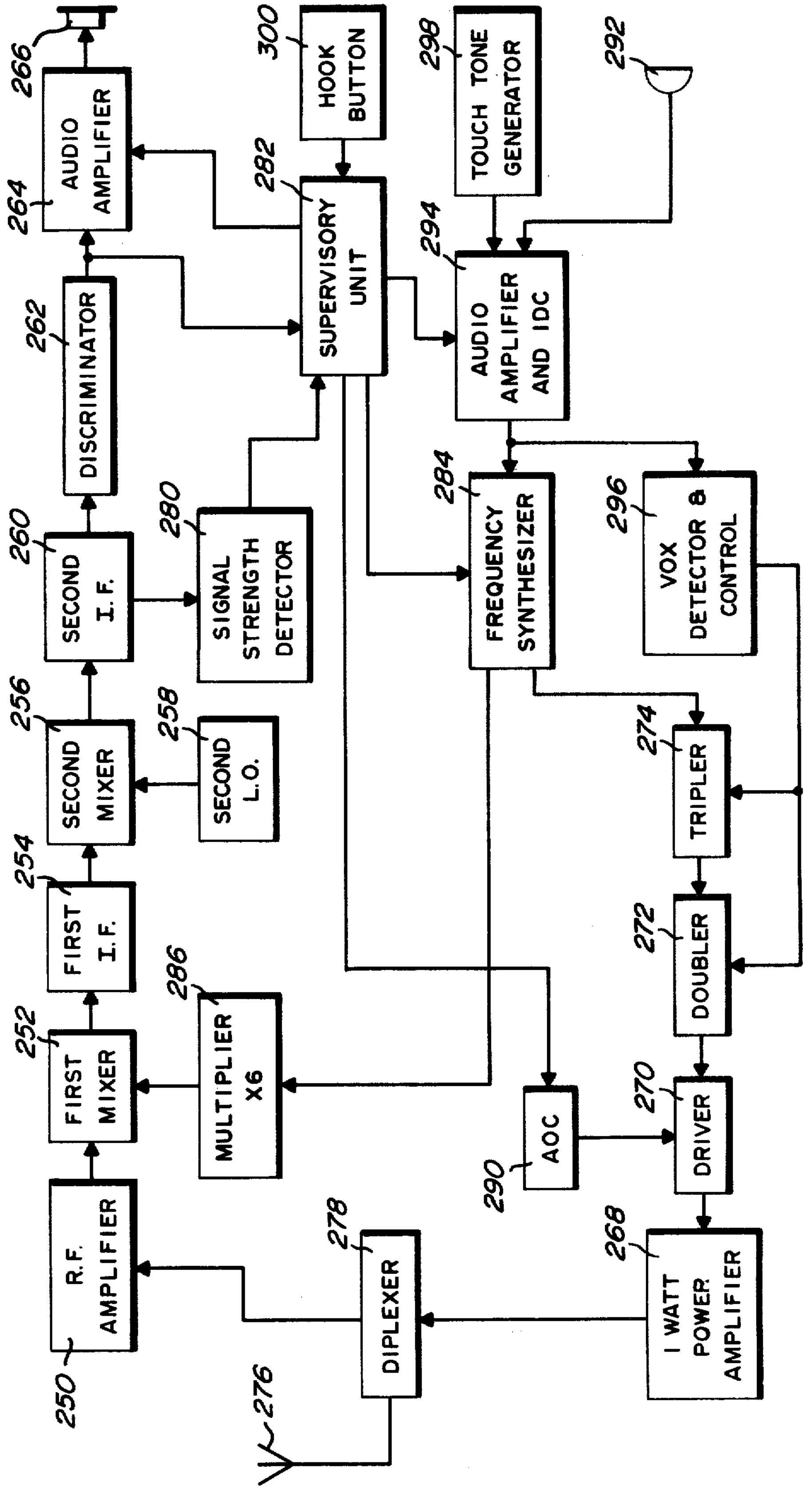
FIG. 9 is a detailed block diagram of one of the portable units usable with the system according to the invention.

Referring to FIG. 9, there is shown a block diagram of a portable unit, such as, for example, the portable unit 132, for use with the system according to the invention. The receiver portion of the portable unit is a dual conversion receiver containing several blocks which are of conventional design including an RF amplifier 250, a first mixer 252, a first IF amplifier 254, a second mixer and second local oscillator 256 and 258, respectively, a second intermediate frequency amplifier 260, a discriminator 262, an audio amplifier 264 and an earpiece 266, all of which operate in a conventional manner. The transmitter portion also contains several conventional blocks including a power amplifier 268, a driver 270, a doubler 272 and a tripler 274. An antenna 276 is connected to a diplexer 278, which is in turn connected to the RF amplifier 250 and the power amplifier 268 for applying signals from the antenna 276 to the RF amplifier 250 and for transmitting power from the power amplifier 268 to the antenna 276.

A signal strength detector 280 is connected to the second IF amplifier 260 of the receiver for detecting the strength of the received signals when the receiver is scanning the signalling channels. The signal strength indications from the detector 280 are applied to a supervisory unit 282 and stored therein. A frequency synthesizer 284 is connected to the supervisory unit 282 and to the tripler 274 of the transmitter. The frequency synthesizer 284 is also connected to the first mixer 252 by means of a multiplier 286 for providing local oscillator injection for the receiver. The supervisory unit 282 causes the frequency synthesizer to change frequency cause the receiver to scan the various signalling frequencies, and upon appropriate command, as described in previous sections of this disclosure, to retune the frequency of the transmitter and receiver to the incoming signalling frequency or voice frequency associated with the strongest received outgoing signalling frequency.

The supervisory unit 282 is also connected to the discriminator 262 and receives tones transmitted by the base stations indicative of excessive portable power being received by the base stations or remote receiver sites. Upon receipt of an excessive power tone from the discriminator 262, the supervisory unit applies a signal to an automatic output control 290, which gradually reduces the power output of the driver 270 until transmission of the excessive power tone has terminated. Upon termination of the excessive power tone, the automatic output control 290 again gradually increases the power output of the driver 270 until excess power is again detected whereupon the power reduction sequence is repeated.

A microphone 292 is connected to an audio amplifier and instantaneous deviation control circuit 294 which is in turn controlled to a voice operated transmitter control 296. The voice operated transmitter detector detects the output of the amplifier 294 for the presence of signals from the microphone 292 or tones from the tone generator 298 and renders the transmitter operative only in the presence thereof, thereby turning off the transmitter to save battery power during pauses in speech.

The supervisory unit 282 is also connected to the audio amplifiers 264 and 294 for rendering the latter inoperative except upon the receipt or initiation of a call as indicated by a signal from the discriminator 262 or the off hook button 300, respectively. The off hook button 300 serves the same function as the cradle buttons in a normal telephone and renders the transmitter operative to transmit its address, as previous described, when a call is being initiated by the portable unit.

Although the invention has been described with reference to particular circuits and embodiments, other embodiments employing the teachings of the foregoing disclosure are deemed to lie within the purview of the invention.

We claim:

1. A portable radio telephone system comprising:

a first base station transmitter site having a first predetermined coverage area and means for simultaneously transmitting signals on a first outgoing signalling channel and a plurality of first outgoing communications channels;

a plurality of first receiver sites associated with said first base station transmitter site, each first receiver site having a first predetermined reception area smaller than said first predetermined coverage area, each of said first receiver sites being located for causing at least a portion of each of said first reception areas to overlap a portion of said first coverage area, each first receiver site having means for simultaneously receiving signals on a first incoming signalling channel paired with said first outgoing signalling channel and a plurality of first incoming communications channels, each of said first incoming communications channels being paired with one of said first outgoing communications channels;

means connecting said first base station transmitter site and said first receiver sites, said connecting means including means for comparing the strength of the signals received by said first receiver sites and for placing the first receiver site receiving the strongest signal on the first incoming signalling channel in electrical communication with said first base station transmitter site;

a second base station transmitter site having a second predetermined coverage area and means for simultaneously transmitting signals on a second outgoing signalling channel and a plurality of second outgoing communications channels;

a plurality of second receiver sites associated with said second base station transmitter site, each second receiver site having a second predetermined reception area smaller than said second predetermined coverage area, each of said second receiver sites being located for causing at least a portion of each of said second reception areas to overlap a portion of said second coverage area, one of said second receiver sites being located for causing at least a portion of the second reception area thereof to overlap a portion of said first coverage area, each second receiver site having means for simultaneously receiving signals on a second incoming signalling channel paired with said second outgoing signalling channel and a plurality of second incoming communications channels, each of said second incoming communications channels being paired with one of said second outgoing communications channels; and means connecting said second base station transmitter site and said second receiver sites, said last mentioned connecting means including means for comparing the strength of the signals received by said second receiver sites and for placing the second receiver sites receiving the strongest signal on the second incoming signalling channel in electrical communication with said second base station transmitter.

2. A system as recited in claim 1 further including at least one portable unit comprising a portable transmitter having a predetermined range less than the range of said first and second base station transmitters site, said portable transmitter having an adjustable operating frequency for transmitting a signal on one of said incoming signalling and communications channels, a portable receiver having an adjustable operating frequency for receiving a signal on one of said outgoing signalling and communications channels, scanning means connected to said portable receiver for rendering said portable receiver operative to sequentially receive signals on each of said outgoing signalling channels, a signal strength detector responsive to the strength of the signals received by said portable receiver connected thereto, and logic means connected to said portable transmitter and to said signal strength detector, said logic means being responsive to said signal strength detector for adjusting the operating frequency of said portable transmitter to the frequency of the incoming signalling channel associated with the strongest received outgoing signalling channel.

3. A system as recited in claim 2 wherein said connecting means further includes means for causing the base station transmitter site communicating with the receiver site receiving the strongest signal on the incoming signalling frequency from said portable unit to transmit a signal on the associated outgoing signalling frequency to said portable unit to assign one of the incoming and outgoing communications channels assigned to the receiver site receiving the strongest signal to said portable unit.

4. A system as recited in claim 3 wherein said portable unit includes means responsive to signals from one of said base station transmitter sites for changing the operating frequency of the portable transmitter and receiver in response thereto.

5. A system as recited in claim 4 wherein each of said base station transmitter sites includes receiving means for monitoring the strength of communications channel transmissions from said portable unit.

6. A system as recited in claim 5 further including means for comparing the strength of the communications channel transmissions received at said base station transmitter sites for determining the geographic location of said portable unit, and for assigning an incoming and an outgoing communications channel thereto for communicating with the receiver site located nearest said portable unit in accordance with said comparison.

7. A system as recited in claim 6 further including means for comparing the magnitude of the signals received by receiving means in any of said receiver sites with a predetermined level, and for causing the transmitter site communicating with a receiver site receiving a signal having an amplitude greater than said predetermined level to transmit a power reduction signal to said portable unit to reduce the power output thereof.

8. A system as recited in claim 7 wherein said portable unit includes power control means connected to said portable receiver and said portable transmitter, said power control means being responsive to a power reduction signal received by said portable receiver for reducing the power output of said portable transmitter in accordance therewith.

9. A system as recited in claim 8 wherein said base station transmitter sites and receiver sites are coupled to a wire line telephone network, and wherein said portable unit includes tone generating means for generating dialing tones for addressing said network.

10. A communications system comprising:

a first base station site located in a first predetermined geographic area and including means for receiving and transmitting signals on a plurality of first radio channels, each of said first radio channels having a predetermined carrier frequency, the carrier frequencies of individual ones of said first radio channels being separated by at least a first predetermined frequency separation;

a second base station site located in a second predetermined geographic area adjacent said first predetermined geographic area, said second base station site including means for receiving and transmitting signals on a plurality of second radio channels, each second radio channel having a predetermined carrier frequency different from the carrier frequencies of said first radio channels, the carrier frequencies of the individual ones of said second channels being separated by at least said first predetermined frequency separation, the carrier frequencies of each of said second channels being further separated from the carrier frequencies of each of said first channels by at least said first frequency separation;

a third base station site located in a third predetermined geographic area non-adjacent to said first geographic area, said third base station site including means for receiving and transmitting signals on a plurality of third radio channels, each of said third radio channels having a predetermined carrier frequency different from the carrier frequencies of said first and second radio channels, the carrier frequencies of individual ones of said third channels being separated by at least said first predetermined frequency separation, the carrier frequencies of each one of said third channels being separated from the carrier frequency of one of said first channels by a second predetermined frequency separation, said second predetermined frequency separation being less than said first predetermined frequency separation;

means connected to said first, second and third base station sites for transferring signals between said base station sites;

a plurality of first receiver sites each including means for receiving signals on said plurality of first radio channels, each of said first receiver sites being located in a predetermined geographic area smaller than said first predetermined geographic area wherein the geographic area of each of said first receiver sites overlaps said first geographic area;

a plurality of second receiver sites each including means for receiving signals on said plurality of second radio channels, each of said second receiver sites being located in a predetermined geographic area smaller than said second geographic area wherein the geographic area of each of said second receiver sites overlaps said second geographic area, one of said second receiver sites including means for receiving signals on said plurality of first radio channels, the geographic area of said one of said second receiver sites overlapping both said first and second predetermined geographic areas;

a plurality of third receiver sites each including means for receiving signals on said plurality of third radio channels, each of said third receiver sites being located in a predetermined geographic area smaller than said third predetermined geographic area wherein the geographic area of each of said third receiver sites overlaps said third geographic area; and means for connecting each of said first, second and third receiver sites to said first, second and third base station sites, respectively.

11. A communications system as recited in claim 10 further including; a fourth base station site located in a fourth predetermined geographic area non-adjacent to said first predetermined geographic area, said fourth predetermined geographic area being separated from said first predetermined geographic area by a predetermined geographic separation greater than the separation between said first and third predetermined geographic areas, said fourth base station site including means for receiving and transmitting signals on at least one of said first radio channels.

12. A portable radio telephone system as claimed in claim 1, further including a portable unit comprising:

means for receiving messages on one of a plurality of outgoing signalling channels and outgoing communications channels, each outgoing communications channel being associated with one of said outgoing signalling channels, each of said outgoing communications channels and outgoing signalling channels having a different predetermined carrier frequency;

means for transmitting messages on one of a plurality of incoming signalling channels and incoming communications channels, each of said incoming signalling channels being associated with only one of said outgoing signalling channels and having a carrier frequency having a predetermined frequency relationship to the carrier frequency of the outgoing signalling channel associated therewith, each of said incoming communications channels being associated with one of said incoming signalling channels and having a carrier frequency different from the carrier frequency thereof;

scanning means connected to said receiving means for sequentially rendering said receiving means operative to receive messages on each of said outgoing signalling channels;

sample and storage means connected to said receiving means for determining the strongest one of the outgoing signalling channels received by said receiving means and storing an indication thereof;

transmitter control means connected to said transmitting means, said transmitter control means including means for rendering said transmitting means operative, said transmitter control means being further connected to said sample and storage means and responsive thereto for adjusting the carrier frequency of said transmitting means to the carrier frequency of the incoming signalling channel associated with the strongest outgoing signalling channel; and logic means connected to said receiving means and to said transmitter control means, said logic means being responsive to predetrmined messages received by said receiving means on the strongest of said outgoing signalling channels for rendering said receiving means operative on one of the outgoing communications channels associated with said strongest outgoing signalling channel, and for adjusting the carrier frequency of said transmitting means to the carrier frequency of one of said incoming communications channels associated with the incoming signalling channel associated with said strongest outgoing signaling channel.

13. A portable unit as recited in claim 12 further including power control means connected to said transmitting and receiving means, said power control means being responsive to a power control signal received by said receiving means for reducing the power output of said transmitting means.

14. A portable unit as recited in claim 13 further including microphone means, said transmitter control means including voice operated control means connected to said microphone means and said transmitting means, said voice operated control means being responsive to signals from said microphone means for rendering and transmitting means operative.

15. A portable unit as recited in claim 13 wherein said scanning means includes a frequency synthesizer.

16. A portable unit as recited in claim 15 further including means for generating signalling tones that are compatible with wire line telephone dialing tones.

17. A radio telephone system for operation in conjunction with a wire line telephone system, including in combination:

a plurality of base station transmitter means, each including means for simultaneously transmitting signals on a plurality of different base transmission frequencies, said transmitting means each having a predetermined geographic location, transmission range and coverage area;

a plurality of portable units each having a portable receiver for receiving transmissions from said base station transmitter means on each of said base transmission frequencies, and a portable transmitter having a shorter range and smaller coverage area than said base station transmitter means, said portable transmitter having means for transmitting on one of a plurality of portable transmission frequencies different from said base transmission frequencies, each portable transmission frequency being associated with one of said base transmission frequencies, said portable receiver including means for sampling the base transmission frequencies and determining the strongest one thereof, and means responsive to said sampling means connected to said portable transmitter for adjusting the frequency thereof to the portable transmission frequency associated with the strongest received base transmission frequency; and a plurality of base station receiver means for receiving transmissions from said portable transmitter on said portable transmission frequencies, the number of base station receiver means being greater than the number of base station transmitter means, each of said base station transmitter means having one of said base station receiver means geographically co-located therewith, the other receiver means being deployed about said base station transmitter means and separated therefrom by approximately twice the transmission range of said portable transmitter, each of said base station receiver means having a reception area thereabout substantially equal to the coverage area of said portable transmitter, at least a portion of the reception area of each of said receiver means overlapping a portion of the coverage area of one of said base station transmitter means.

18. A radio telephone system as recited in claim 17 wherein each of said base station transmitter means and each of said base station receivers is electrically coupled to said wire line telephone network for providing communications therewith.

19. A radio telephone system as recited in claim 18 wherein each of said portable units has a unique address, and means for transmitting signalling tones representative of a particular address for establishing communications with the unit having said particular address, and computer means coupled to said base station transmitter means for receiving and storing a representation of each of said addresses.

20. A radio telephone system as recited in claim 19 further including means for transmitting a particular address in response to dial signals received from said wire line telephone network for establishing communications between said wire line network and the unit having said particular address.

21. A radio telephone system for operation in conjunction with a wire line telephone network including in combination:

a first base station transmitter having a first predetermined geographic coverage area for simultaneously transmitting signals on a plurality of first outgoing channels having at least a first predetermined frequency separation between adjacent channels;

a plurality of first receiver sites coupled to said first base station transmitter and located within said predetermined geographic coverage area, each of said receiver sites having a first predetermined reception area smaller than said first geographic coverage area, each first receiver site being adapted to simultaneously receive signals on a plurality of first incoming channels having frequencies different than said first outgoing channels, each of said first incoming channels being associated with one of said first outgoing channels, the frequency separation between adjacent ones of said first incoming channels being substantially equal to frequency separation between adjacent ones of said first outgoing channels;

a second base station transmitter located outside said first predetermined geographic coverage area having a second predetermined geographic coverage area for simultaneously transmitting signals on a plurality of second outgoing channels each channel having a frequency different than any of the frequencies of said first outgoing channels, the frequency separation between adjacent ones of said second outgoing channels being equal to at least said first predetermined frequency separation, each of said second outgoing channels being separated in frequency from one of said first outgoing channels by less than said first predetermined frequency separation; and a plurality of second receiver sites coupled to said second base station transmitter and located within said second predetermined coverage area, each of said second receiver sites having a second predetermined reception area smaller than said second geographic coverage area, each receiver site being adapted to receive signals on a plurality of second incoming channels having frequencies different than the frequencies of said first and second outgoing channels and said first incoming channels, each of said second incoming frequencies being associated with one of said second outgoing channels, the frequency separation between adjacent ones of said second incoming channels being substantially equal to the frequency separation between adjacent ones of said second outgoing channels, each of said second incoming channels being separated in frequency from one of said first incoming channels by less than said first predetermined frequency separation.

22. A radio telephone system as recited in claim 21 wherein each of said first outgoing channels is paired with a particular single one of said first incoming channels, and each of said second outgoing channels is paired with a particular single one of said second incoming channels, each channel pair forming a duplex channel.

23. A radio telephone system as recited in claim 22 wherein a particular one of each of said first and second outgoing channels is designated a signalling channel and each of said first and second base station transmitters includes means for transmitting digital signals on the predetermined one of each of said first and second outgoing channels designated as a signalling channel, respectively, each of the receiver sites located within said first predetermined geographic area including means for receiving digital signals on the incoming channel paired with said first outgoing signalling channel, and each of the receiver sites located within said second predetermined geographic area including means for receiving digital signals on the incoming channel paired with said second outgoing channel.

24. A radio telephone system as recited in claim 23 wherein the other ones of said incoming and outgoing channels are designated as voice channels and each of said first and second base station transmitters includes means for simultaneously transmitting voice signals on the ones of said first and second outgoing channels denoted as voice channels, respectively, and each of said first and second receiver sites includes means for receiving voice messages on the incoming channels paired with said first and second outgoing voice channels, respectively.

25. A radio telephone system as recited in claim 24 wherein each of said receiver sites includes means for sensing the strength of the incoming voice and digital signals received thereby.

26. A radio telephone system as recited in claim 25 further including means connected to said receiver sites and said wire line telephone network for comparing the strengths of the incoming digital signals received by said first and second receiver sites and for electrically coupling the one of said first receiver sites receiving the strongest digital signal and the one of said second receiver sites receiving the strongest digital signal to said wire line telephone network.

27. A radio telephone system as recited in claim 26 further including a plurality of portable units operable in said first and second predetermined geographic areas, each portable unit having a portable transmitter having a portable geographic coverage area substantially similar to one of said first and second reception areas and a portable receiver having a portable reception area substantially similar to one of said first and second geographic coverage areas, said portable transmitter being automatically tunable to one of said first and second incoming channels and said portable receiver being automatically tunable to one of said first and second outgoing channels in response to control signals from one of said base station transmitters.

28. A radio telephone system as recited in claim 27 further including means connected to said first and second base station transmitters and responsive to the strength of the signals received by said receiver sites on one of said incoming signalling channels for causing one of said base station transmitters to transmit a signal on the outgoing signalling channel paired with said one of said incoming signalling channels for causing said portable transmitter to automatically tune to the incoming voice channel of the receiver site receiving the strongest signal on the incoming signalling channel thereof and to automatically cause said portable receiver to tune to the outgoing voice channel paired therewith.

29. A radio telephone system as recited in claim 28 further including a plurality of location receivers, one of said location receivers being located in each of said first and second predetermined geographic areas for receiving signals on each of said voice channels, said location receivers including means for determining the strength of the voice channel signals received thereby for determining the geographic location of said portable units, said location receivers including means connected to said base station transmitters for causing one of said base station transmitters to transmit a signal for tuning the portable transmitters and receivers of said portable units in accordance with the geographic location thereof.

30. A radio telephone system as recited in claim 21 wherein said first predetermined frequency separation is 25 KHz, each of said first outgoing channels is separated from one of said second outgoing channels by 8.33 KHz, and each of said first incoming channels is separated from one of said second incoming channels by 8.33 KHz.

31. A radio telephone system as recited in claim 21 including a predetermined number of base station transmitters, each having a predetermined geographic coverage area, each having means for simultaneously transmitting signals on a plurality of outgoing channels, each outgoing channel having a different frequency, the outgoing channels of each individual base station transmitter being separated by at least said first predetermined frequency separation, the frequency separation between outgoing channels of different transmitters being equal to said first predetermined frequency separation divided by the number of base station transmitters comprising said plurality of base station transmitters.

* * * * *

UNITED STATES PATENT OFFICE

CERTIFICATE OF CORRECTION

Patent No. 3,906,166 Dated September 16, 1975

Inventor(s) Martin Cooper, et al

It is certified that error appears in the above-identified patent and that said Letters Patent are hereby corrected as shown below:

The name Albert J. Mikulski should be changed to Albert J. Leitich.

Signed and Sealed this

*tenth* Day of *February 1976*

[SEAL]

*Attest:*

RUTH C. MASON
*Attesting Officer*

C. MARSHALL DANN
*Commissioner of Patents and Trademarks*